(12) United States Patent
Foerg et al.

(10) Patent No.: US 12,304,438 B2
(45) Date of Patent: May 20, 2025

(54) DETERMINING A GEOMETRIC CENTER POSITION OF A VEHICLE

(71) Applicant: Washtec Holding GmbH, Augsburg (DE)

(72) Inventors: Oliver Foerg, Augsburg (DE);
Bernhard Heinz, Gersthofen (DE);
David Stecher, Monheim (DE)

(73) Assignee: Washtec Holding GmbH, Augsburg (DE)

( * ) Notice: Subject to any disclaimer, the term of this patent is extended or adjusted under 35 U.S.C. 154(b) by 136 days.

(21) Appl. No.: 17/739,095

(22) Filed: May 7, 2022

(65) Prior Publication Data

US 2022/0258700 A1 Aug. 18, 2022

Related U.S. Application Data

(63) Continuation of application No. PCT/EP2020/080897, filed on Nov. 4, 2020.

(30) Foreign Application Priority Data

Nov. 7, 2019 (DE) ...................... 10 2019 130 066.5

(51) Int. Cl.
*B60S 3/06* (2006.01)
*G01B 7/00* (2006.01)
*B60S 3/04* (2006.01)

(52) U.S. Cl.
CPC ............... *B60S 3/063* (2013.01); *G01B 7/003* (2013.01); *B60S 3/04* (2013.01); *B60S 3/06* (2013.01)

(58) Field of Classification Search
CPC . G01B 7/003; B60S 3/063; B60S 3/06; B60S 3/04
See application file for complete search history.

(56) References Cited

U.S. PATENT DOCUMENTS

| 3,823,356 | A | 7/1974 | Paavola et al. |
| 9,862,360 | B2 * | 1/2018 | Lapeer ................... B08B 13/00 |
| 10,994,705 | B2 | 5/2021 | Auer et al. |
| 2020/0377061 | A1 | 12/2020 | Endress et al. |

FOREIGN PATENT DOCUMENTS

| DE | 100211 A5 | 9/1973 |
| DE | 202014104038 U1 | 1/2016 |
| DE | 102014112388 A1 | 3/2016 |
| DE | 102017105061 A1 | 9/2018 |
| EP | 0231486 A1 * | 8/1987 |
| JP | 63195050 A | 8/1988 |

(Continued)

OTHER PUBLICATIONS

Machine Translation of WO 2018162662 A1 to Conrad. (Year: 2018).*

(Continued)

*Primary Examiner* — Benjamin L Osterhout
(74) *Attorney, Agent, or Firm* — Ewers IP Law PLLC; Falk Ewers

(57) ABSTRACT

The present disclosure relates to a washing system with a device for determining a geometric mid position of a vehicle positioned within the washing system. For this purpose, positions of two movable carriages, on each of which a lateral cleaning brush is mounted, are detected and used to calculate the mid position.

9 Claims, 7 Drawing Sheets

(56) References Cited

FOREIGN PATENT DOCUMENTS

| | | | | |
|---|---|---|---|---|
| JP | 01306350 A | 12/1989 | | |
| JP | H09309411 A * | 12/1997 | | |
| JP | 5525996 B2 | 6/2014 | | |
| WO | WO-0050278 A1 * | 8/2000 | .............. | B60S 3/002 |
| WO | WO-2018162662 A1 * | 9/2018 | ................ | B60S 3/04 |

OTHER PUBLICATIONS

Machine Translation of WO 0050278 A1 to Dietsch. (Year: 2000).*
Machine Translation of JP H09309411 A to Koieke et al. (Year: 1997).*
Machine Translation of EP 0231486 A1 to Donner. (Year: 1987).*
Office Action issued in German Patent Application No. DE 10 2019 130 066.5 (from which this application claims priority), dated Feb. 2, 2021 and English language machine translation thereof.
International Search Report of the European Patent Office in PCT/EP2020/080897 (from which this application claims priority) mailed Jan. 22, 2021 and English-language translation thereof.

* cited by examiner

DETERMINING A GEOMETRIC CENTER POSITION OF A VEHICLE

CROSS REFERENCE TO RELATED APPLICATIONS

This application is a continuation application of international patent application PCT/EP2020/080897, filed Nov. 4, 2020, designating the United States and claiming priority to German application 10 2019 130 066.5, filed Nov. 7, 2019, and the entire content of both applications is incorporated herein by reference.

TECHNICAL FIELD

The present disclosure relates to a washing system having means for calculating a geometric center position of a vehicle positioned within a washing system. In addition, the present disclosure relates to a method for cleaning a vehicle and a computer program.

BACKGROUND

Vehicles, and in particular their bodywork (chassis), often have structures that contain add-on parts, protrusions or indentations that either create a desired design or achieve a technical effect. However, these structures make cleaning the vehicle more difficult, especially automatic cleaning in a gantry car wash or car wash system. In this context, a gantry car wash is understood to be a car wash in which the vehicle remains in one position during the cleaning process, whereas a car wash line is understood to be a car wash in which the vehicle is pulled through the car wash line by a drag chain during the cleaning process. For generalization purposes, the term car wash system is used in the present disclosure as a superordinate term for a gantry car wash system and a car wash line. However, with reference to the respective technical differences, the specific term gantry car wash or car wash line is used. Washing systems known in the prior art have a rotating roof brush and two rotating side brushes for cleaning a vehicle, since the rotating roof brush on its own cannot engage all structures, in particular the structures at the front and rear of the vehicle. For example, in the case of protrusions on the body, the brush hairs of the roof brush do not reach all surfaces, in particular the corners of the protrusion, due to a setback, with the result that cleaning is not complete or the cleaning result is qualitatively inadequate. To improve the front and rear wash, in prior art car washes the two rotating side brushes move beyond the center position of the car wash in one direction and the other during the front and rear wash, so that a complete cleaning of the vehicle can be achieved. Travelling beyond the center position (i.e. mid position), by means of a center overlap, is necessary because the rotating side brushes cannot converge to zero and thus overlapping of the brush hairs is not possible. For this purpose, it is necessary to determine the center position.

Washing systems known in the prior art carry out the necessary determination of the center position in relation to their "own" center (longitudinal center axis of the washing system), which has the disadvantage that in the case of smaller and very off-center positioned vehicles, one of the two rotating side brushes moves beyond the width of the vehicle and barely touches the vehicle. As a result, this can lead to a qualitatively inadequate cleaning result under the circumstances mentioned.

FIG. 3 shows a car wash with a vehicle 30 positioned very off-center in the car wash. The arrow F represents the direction of travel of the vehicle 30. The center overlap is based on the center axis MV of the car wash. In this regard, the traverse of the rotating cleaning brushes 11, 12 for cleaning the front of the vehicle is performed starting from the center axis MV of the washing system in the left and right directions, respectively. When the rotating cleaning brushes 11, 12 move in the right direction, the rotating cleaning brush 12 moves beyond the vehicle 30, whereby contact between the rotating cleaning brush 12 and the vehicle 30 may be lost. In the area of the vehicle, the loss of contact causes the rotating cleaning brush 12 to buckle away or the contact pressure of the rotating cleaning brush 12 on the vehicle to be too low, with the result that this area, in particular the edge and curve of the rear of the vehicle, is not cleaned at all or is cleaned only inadequately. In addition, moving the cleaning brushes in the direction without cleaning effect costs process time.

SUMMARY

It is therefore an object of the present disclosure to provide means and measures for a car wash in order to enable an improved cleaning result even for vehicles positioned off-center and/or at an angle and to at least partially eliminate the disadvantages of the car washes known in the prior art.

According to the disclosure, this object is solved by a washing system, a device, a method for determining a geometric center position of a vehicle positioned within a washing system, a method for cleaning and a device as well as by a computer program as described herein.

According to a first aspect, the disclosure relates to a car washing system having a device for determining a geometric center position of a vehicle positioned within the car wash, comprising:

- a gantry traverse (hereinafter referred to as "traverse"), which extends essentially transversely to the longitudinal axis of the vehicle and on which two travel carriages movable in the longitudinal direction of the traverse are arranged;
- a first cleaning brush which is suspended from the first carriage and, in particular, is rotatable about an approximately vertical axis of rotation, is detachably mounted on a suspension and is pivotable in at least one pivot axis a second cleaning brush suspended from the second carriage and having in particular the same characteristics as the first cleaning brush;
- a first measuring unit on the first carriage for detecting a travel position of the first carriage and a second measuring unit on the second carriage for detecting a travel position of the second carriage; and wherein the device is designed to determine the geometric center position of the vehicle positioned within the washing system based on the detected travel positions of the first travel carriage and the second travel carriage.

The disclosure has the advantage that the washing process can be accelerated and qualitatively improved by determining the center position in advance. According to the disclosure, the center position is no longer determined as a function of the car wash (as the center of the car wash), but takes into account the actual position of the vehicle in the car wash. An off-center positioning and even a tilted position of the vehicle (in an angular range of +/−10° are automatically detected, and the washing process can be adjusted or modified taking into account this actual position of the vehicle relative to the washing system. Therefore, the formulation "the crossbeam extends essentially transverse to the longitudinal axis of the vehicle" was chosen above to cover skew positions (longitudinal axis of the vehicle deviates from the longitudinal axis of the washing system).

The washing system is symmetrical in relation to its longitudinal axis, in particular in relation to its central longitudinal axis. Therefore, it can be assumed in the following that if structural units or constructive or functional measures are described on one side, this should also apply analogously or accordingly to the other side, unless something different is explicitly mentioned.

Skew positions can be determined by different methods. In a preferred embodiment, skew positions can be determined, in particular, by carrying out the process described above for determining the center position (e.g., by moving the two lateral cleaning brushes inward and, when contact is made with the vehicle, by detecting the position of the carriage) several times along the length of the vehicle (hereinafter also referred to as "vehicle" for short). Thus, for example, the determination can be carried out at the front, approximately in the middle of the vehicle and at the rear. The determined values are stored and can optionally be compared in a further calculation step for agreement. If the values deviate significantly from each other, a skewed position can be concluded purely by calculation. Corresponding warnings and control signals can be provided. Alternatively or cumulatively, signals from further sensors (e.g., light barriers for measuring the vehicle width and/or length) can be taken into account.

In a further preferred embodiment, the washing system comprises a third measuring unit which includes a first power sensor as an electronic component for detecting the power consumption of the first cleaning brush and, analogously, a fourth measuring unit which includes a second power sensor for detecting the power of the second cleaning brush, wherein the first and second (side) cleaning brushes are each driven via a brush rotation drive. The power sensors are used to record the rotational power of the side brush. The side brushes are initially moved inwards towards the vehicle from the outside, so that they initially rotate freely and are not yet in contact with the vehicle and only come into engagement with the vehicle or its components during progressive lateral movement inwards, which is regularly associated with an increase in power consumption, since the brushes then no longer rotate freely. This signal change can be detected and indicates the time at which the brush comes into contact with the KFZ. In a first embodiment, this point in time can be used to detect the position of the carriage of the respective brush and to use it to calculate the center position.

In a further preferred embodiment, the third measuring unit includes an angle sensor which can be arranged at least partially on the first cleaning brush and is used to detect an angle of inclination of the first cleaning brush about at least one swivel axis that extends transversely to the longitudinal direction of the washing system. Similarly, the fourth measuring unit includes an angle sensor, e.g., on the second cleaning brush which can be designed to detect an angle of inclination of the second cleaning brush about a swivel axis which also runs transversely to the longitudinal direction of the washing system. This has the technical background that most vehicles have inclined side surfaces. Furthermore, the side brushes can be operated in two modes:

activating the swivel—the brush can be deflected, especially in the above-mentioned swivel axis and deactivating the swiveling capability—the brush is fixed in its vertical undeflected home position.

The brush is operated before or during the inward travel of the respective carriage in operating mode 1 with activated swiveling. Since there is initially no engagement with the motor vehicle, the brush remains in its vertical position. However, as soon as the brush is guided to the motor vehicle and the carriage is moved further inwards, this automatically causes the brush to contact the lateral inclined side surface of the motor vehicle and thus leads to a deflection of the axis of the brush and thus to a change in angle, which is detected. This signal change (here: of the angle) can be detected and indicates the time at which the brush comes into contact with the motor vehicle. In a second embodiment, this point in time can be used to detect the position of the carriage of the respective brush and to use it to calculate the center position. In other words, the detected signal change (e.g., different angle signal and/or different power of the brush rotation) serves as trigger signal for reading out or detecting or storing the current travel carriage position.

It is also possible to combine the first execution for the detection of the cleaning brush being in contact with the motor vehicle (detection of changed power consumption) and the second execution (detection of changed angle). In particular, the first calculation (according to the first embodiment) can serve to validate the result of the second calculation/execution or vice versa. Thus, it becomes possible to increase the quality of the center calculation. Furthermore, it is possible to correctly determine the center position even of those types of motor vehicles that do not have inclined side surfaces (vans, buses, etc.). Accordingly, the device can be designed to use in each case that travel position of the first travel carriage and of the second travel carriage for determining the center position which is detected at a time at which a third or fourth measuring unit detects a changed measurement result (change in angle) and/or at which a first or second power sensor for detecting the power consumption of the first and second cleaning brush detects a changed measurement result (change in power consumption). Advantageously, the detection of whether the cleaning brush is or comes into contact with the respective outer surface of the vehicle can thus take place by a third or fourth measuring unit (e.g., angle sensor) and/or a power sensor for the first cleaning brush or for the second cleaning brush detecting a changed measurement signal as a result.

In a further preferred embodiment, the first measuring unit, the second measuring unit, the third measuring unit and/or the fourth measuring unit may comprise a magnet and a magnetic field sensor. This has advantages in that the function of the sensor is not dependent on temperature and humidity, is not sensitive to vibrations and cannot be influenced by water pressure. The first and second measuring units for detecting a movement or change in position of the carriage or, indirectly, of the central longitudinal axis of the respective lateral cleaning brushes can be designed, for example, as a linear magnetic Hall sensor for detecting the position of linear displacements of the carriage along the traverse. Alternatively, optical and/or inductive displacement measuring systems can be used. The measuring units can also be designed as an electronic integrated circuit (e.g., with Hall sensors and signal processing), which enables small designs.

In an advantageous embodiment of the disclosure, it may be provided that the travel positions are determined only intermittently and, in particular, only when the associated cleaning brush is in contact with the vehicle. Alternatively, in order to reduce memory space, it can preferably also be configured that the travel positions are determined continuously and successively but are only stored when the cleaning brush is in contact with the vehicle.

In an advantageous embodiment of the disclosure, the device can further be designed to control, activate and/or deactivate further cleaning units of the washing system in a dedicated manner based on the determined center position of the vehicle. If, for example, the washing process is nevertheless to be carried out in the case of an off-center positioned motor vehicle, then the washing aggregates on both sides can be controlled asymmetrically. In particular, the units on the more distant side can be at least partially fed further than the units on the opposite side. For example, the rim cleaning can be deactivated if no cleaning effect can be achieved due to an excessive distance between the wheel and the cleaning unit. In an advantageous way, the process time can thus be optimized. If the measured width of the vehicle is available as a data set in addition to the calculated center position (measured or calculated via sensors), in a further development of the disclosure the rim washers can be controlled in a decided and modified manner, e.g., by feeding them further in order to compensate for the greater distance between the rim and the cleaning unit (e.g., caused by a skewed position or by off-center vehicle positioning), as far as possible. Furthermore, the user of the washing system can call up information corresponding to the cleaning result via an output unit (PULL mode) or can have this information provided (PUSH mode).

If the vehicle is positioned off-center and/or at an angle, a corresponding message can be issued to the operator and/or driver. The latter can be informed in particular that quality losses are to be expected. For this purpose, the washing system and in particular the device can comprise an output unit for outputting a warning signal, for example a monitor, computer, terminal, handheld, based on the determined center position of the vehicle (e.g., acoustically and/or optically, with or without graphic representation of corrective measures for repositioning the motor vehicle). The information output may include positioning information of the vehicle in the car wash, as well as information about the cleaning process and the cleaning parameters resulting from the positioning (e.g., expectation of an insufficient wash result due to incorrect positioning of the motor vehicle). In an advantageous way, the cleaning process can thus be checked and evaluated.

In another advantageous embodiment of the disclosure, the first and/or second measuring unit (for detecting the carriage position) may comprise an incremental encoder or an absolute encoder. The device may further comprise other signal transmitters, such as light barriers.

According to a further aspect, the disclosure relates to a device for determining a geometric center position of a vehicle positioned within the car wash for use for or in a car wash as described above. Preferably, the apparatus is adapted to perform the method for determining the center position as just described. Thus, the method for calculating the center position based on the actual vehicle position can be offered as a separate module (e.g., as ADD-ON, available with an additional license for the operator) also for car washes already in operation.

So far, the disclosure has been described in relation to the claimed washing system. Features, advantages or alternative embodiments described or claimed in connection with the washing system or the device may also be transferred to the method described below or to the other claimed subject matter (e.g., the computing unit or a computer program), and vice versa. In other words, the subject matter claimed or described in relation to the washing system may be improved by features described or claimed in relation to the method, and vice versa. In this case, the structural units of the device are embodied by functional features of the method and vice versa. Generally, in computer science, a software implementation and a corresponding hardware implementation are equivalent. For example, a method step for "detecting positions" may be performed using a corresponding signal generator for detecting location data. To avoid redundancy, the computing unit may also be used in the alternative embodiments described with reference to the method, but these embodiments are not explicitly described again for the computing unit.

According to a further aspect, the disclosure relates to a computer-implemented method for determining a geometric center position of a vehicle positioned within a car washing system, wherein the car washing system comprises a traverse, which extends approximately transversely to the longitudinal axis of the vehicle and on which two carriages movable in the longitudinal direction of the traverse are arranged, and wherein the car washing system further comprises: a first cleaning brush suspended from the first carriage, and a second cleaning brush suspended from the second carriage, comprising the steps of:

providing control signals for a drive motor for moving the traverse relative to the vehicle (gantry car wash) or vice versa (car wash) into a measuring position, wherein at least one first cleaning brush and at least one second cleaning brush are arranged on the traverse. For the washing process, the two cleaning brushes can be guided along a first and a second outer surface of the vehicle, respectively;

as soon as the measuring position has been taken: provision of control signals for moving the first and second carriage inwards until it is detected that the cleaning brush comes into contact with a respective outer surface of the vehicle and fixing of the carriage or termination of the movement of the first and second carriage;

in the fixed state: detection of a travel position of the first carriage via a first measuring unit and detection of a travel position of the second carriage via a second measuring unit;

determining the geometric center position of the vehicle positioned within the washing system, based on the detected travel positions of the first travel carriage and the second travel carriage.

The term "measuring position" refers to a relative position between the respective lateral cleaning brush on the traverse and the vehicle, in which, in a plan view, the two lateral brushes are arranged with their axis of rotation at the height of the vehicle. When the lateral cleaning brushes are then moved inwards by means of the carriage, it is ensured that they come into contact with the vehicle and, in particular, with the respective lateral outer surface of the motor vehicle. There can be several measuring positions along the length of the vehicle, so that the data acquisition can be carried out several times sequentially at different positions in relation to the longitudinal extent of the vehicle.

The term "center position" (mid position) means the center of the vehicle. The center of the vehicle is no longer determined by the center of the car wash, but is intended to take into account the current position of the vehicle in the car wash, especially if the center longitudinal axis of the vehicle deviates from the center longitudinal axis of the car wash, i.e. lateral inaccurate positioning or incorrect positioning. In the case of an off-center positioned vehicle, the center position determined according to this proposal thus does not coincide with the center of the car wash and thus correctly identifies the current position of the vehicle.

In a further aspect, the disclosure relates to a computer program with program code for executing the above-described method for determining or for computer-aided calculation of the center position when the computer program is executed on an electronic device (computer or microprocessor of a control system of a car washing system). The computer program can be installed locally or made available by download from a server via a network connection. Furthermore, it is possible to execute only the location-bound process steps of detecting the two positions of the carriages locally on the washing system and to execute the calculation of the center position on another unit, e.g., on a (possibly more powerful) central server or in a cloud, which can be operated as a distributed database for a large number of washing systems. Thus, the system can be designed as a distributed system with appropriate network connections.

Another aspect of the disclosure relates to a cleaning method for cleaning a vehicle positioned within a car washing system, comprising the steps of:

determining the geometric center position of the vehicle using a method as described above;

cleaning of the vehicle positioned within the washing system and control of cleaning units, in particular the cleaning brushes based on the determined geometric center position of the vehicle.

For the purposes of the present disclosure, "can be guided along" means that the cleaning brushes, in particular the rotating lateral cleaning brushes, are in contact with an outer contour of the vehicle and are moved along the longitudinal extension direction of the vehicle during the cleaning process. The longitudinal extension direction of the vehicle results from the direction of travel view. The center position of the vehicle is the geometric center of the vehicle, which results from the total width of the vehicle and represents half of the vehicle width. Advantageously, this can be calculated correctly with the method presented here even for vehicles positioned at an angle and/or off-center.

In particular in the case of a portal washing system, the traverse can be designed as a movable unit, e.g., in the form of a gate. The shape of a gate results from a horizontally running traverse and two vertically positioned gantry columns. The longitudinal axis of the traverse is arranged transversely to the direction of extension of the vehicle and can be moved along the direction of extension of the vehicle positioned in the washing system. The traverse can be moved by means of a drive unit from a first end of the vehicle, for example the front, to the second end of the vehicle, the rear, and vice versa. Alternatively, the traverse can be moved by two drive units that are controlled so that both sides of the traverse are moved synchronously.

The first carriage and the second carriage are designed to accommodate the first cleaning brush and the second cleaning brush—preferably in a detachable manner. The carriage can be moved by an electric drive in the direction in which the traverse extends. In an advantageous manner, the first cleaning brush and the second cleaning brush can thus be moved from the outside in the direction of the vehicle sides of the vehicle and back. Thus, different sized vehicles can be cleaned evenly, or the cleaning of the vehicle can be adjusted according to the lateral contour of the vehicle.

Known technical systems for determining a travel distance can be used as first and second measuring units for detecting a travel position of the respective carriage, such as position sensors, which can be designed as incremental encoders, for example. The incremental encoders can be based on different measuring principles (e.g., photoelectric, magnetic, etc.).

For the purposes of the present disclosure, releasable mounting of the cleaning brush means that the cleaning brush has a fixed connection to the carriage which can be released, if necessary, for example to replace the cleaning brush due to wear.

Furthermore, for the purposes of the present disclosure, a device is to be understood as a computing unit. The computing unit for carrying out the above-mentioned computational task may be designed as a computer unit, for example as an embedded computer or a microprocessor/micro controller. Furthermore, the device may be designed as a programmable logic controller. Furthermore, the device may be formed as a computing unit on which a software PLC is hosted. The computing unit may be formed internally, inside the car wash, or externally, outside the car wash with appropriate data connections, including as a computer, a personal computer, or a workstation on a computer network. The computing unit may include a processing unit (processor or processors), a system memory, and a system bus that couples various system components including the system memory to the processing unit. The computing unit may optionally include a user interface so that a user may input commands and information into the computer via input devices, such as a keyboard and pointing device, and/or via which messages or results are output. These and other input devices are often connected to the processing unit via a serial interface coupled to the system bus.

The present disclosure is based on the knowledge that a vehicle that is not optimally positioned in a car wash can have an influence on the process time and the quality of the cleaning process. By means of the present disclosure, the center position of a vehicle positioned in the car wash can be determined and the center overlap during cleaning of the rear or front of the vehicle can be performed based on the determined center position of the vehicle. In particular, it is possible to move the two rotating side brushes for cleaning the vehicle (with side surfaces, vehicle rear and vehicle front) in accordance with the current vehicle position. In this way, the side brushes are moved to the left and right, in particular to match the vehicle and its orientation, to such an extent that optimum cleaning and center coverage can be achieved without "free-running" of the side brushes beyond the motor vehicle. This is made possible by taking into account the calculated center position of the vehicle, which saves process time by no longer having to drive over the vehicle contour. Advantageously, units of the washing system no longer have to be moved just to detect a center position. There is therefore no "unnecessary" cleaning. Advantageously, the process time of the cleaning operation can also be saved. In addition, the quality of cleaning is improved, especially at the lateral ends or curves of the vehicle rear or front.

Advantageously, the present disclosure can determine a tilted or skewed position of the vehicle positioned in the car wash. A tilted position is to be understood as a position of the vehicle within the washing system in which the vehicle is not positioned parallel to the travel path of the washing system (in the case of a portal washing system). The skewed position has the consequence that, for example, a first side brush must always move behind in order not to lose contact with the vehicle, while an oppositely arranged second side brush must always move further back, since this side brush would be guided too close to the vehicle. The disclosure enables certain cleaning units (e.g., rim brushes) to be controlled in a dedicated manner according to the currently detected (possibly skewed) position of the vehicle in the system. According to the skewed position, cleaning aggregates and cleaning steps can and/or must be deactivated and/or omitted during the cleaning process, as they could otherwise possibly damage the vehicle.

In addition, the rotating side brushes and/or selected other cleaning units can be optimized according to the skew position and controlled in a dedicated or different way to increase the process time and/or the cleaning result.

Furthermore, by means of the present disclosure, the exact positioning of the vehicle in the washing system can be determined, whereby further process parameters for the cleaning process can be optimized, thus achieving an optimal process time and cleaning result.

Advantageous embodiments and further developments result from the subclaims, as well as from the description with reference to the figures.

The detection of the travel positions of the first and/or second carriage can also be validated with further sensor signals detected by the device. Among other things, read-in geometry data of the vehicle and/or optical signals from light barriers can be used for this purpose.

In a further advantageous embodiment, the device is further configured to control certain cleaning aggregates, e.g., during an application of preservatives, based on the determined center position of the vehicle.

In a further advantageous embodiment, the device is also designed to control cleaning units for providing drying air based on the determined center position of the vehicle. The drying result can thus be optimized in an advantageous manner. For example, the two side blowers can be controlled asymmetrically and independently of each other and depending on the vehicle position. With knowledge of the position of the vehicle (distance of the vehicle from the side blower), for example, if the distance between the vehicle and the side blower is greater, the latter could be operated with increased power to compensate, so to speak, for the off-center position of the vehicle.

In a further advantageous embodiment, the car wash is a gantry car wash. By determining the center position of the vehicle, the center overlap process does not have to be carried out over the entire width of the gantry car wash and thus the maximum travel distance, but only over the width of the vehicle, which means that the process time for the cleaning operation can be reduced. In addition, an appropriate contact pressure can be ensured at the edges and curves of the rear and front of the vehicle, which means that the cleaning result is of a higher quality than with the washing systems known in the prior art.

In another advantageous embodiment, the washing system is designed as a conveyer or washline car wash. This results in the advantages already mentioned for the gantry car wash. This is particularly advantageous because in a car washline the vehicle is in constant motion and moves at a constant belt speed, and subsequent cleaning sections can only take place once previous cleaning sections have been completed or cleaning units have moved out of the danger zone. Otherwise, a cleaning process delay will lead to a stop of the car wash or to a collision.

The above embodiments and further embodiments can be combined with each other as desired, if useful. Further possible embodiments, further developments and implementations of the disclosure also include combinations, not explicitly mentioned, of features of the disclosure described before or below with respect to the embodiments. In particular, the skilled person will thereby also add individual aspects as improvements or additions to the respective basic form of the present disclosure.

In the following detailed description of the figures, non-restrictive examples of embodiments with their features and further advantages are discussed on the basis of the drawing.

BRIEF DESCRIPTION OF THE DRAWINGS

The disclosure will now be described with reference to the drawings wherein.

DESCRIPTION OF EXEMPLARY EMBODIMENTS

Figure 1:
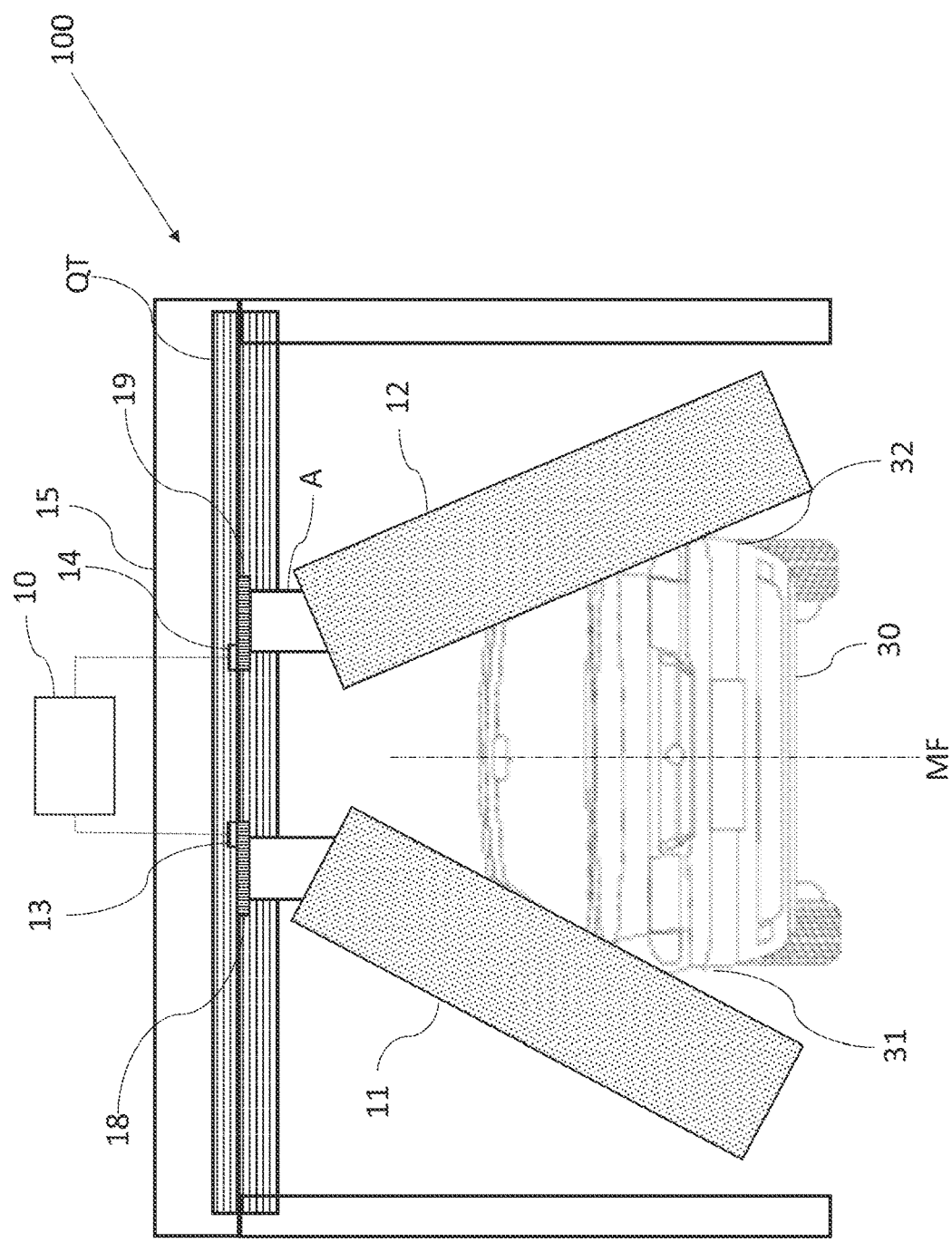
FIG. 1 is a simplified illustration of an exemplary embodiment of a washing system according to the disclosure.

The accompanying drawings are intended to provide a further understanding of exemplary embodiments of the disclosure. They illustrate exemplary embodiments and, in connection with the description, serve to explain principles and concepts of the disclosure. Other exemplary embodiments and many of the advantages mentioned will be apparent in view of the drawings. The elements of the drawings are not necessarily shown to scale with respect to each other.

In the figures of the drawing, identical elements, features and components with the same function and the same effect are to be given the same reference signs in each case, unless otherwise specified.

FIG. 1 shows an illustration of an exemplary embodiment of a washing system according to the disclosure.

In FIG. 1, reference character 100 denotes the car washing system according to the disclosure with a device 10 for determining a geometric center position MF of a vehicle 30 positioned within the car wash system 100. The car wash system 100 can be designed as a gantry or portal car wash system or a car wash system line. In the portal washing system, the vehicle (KFZ) to be cleaned remains at one position during the cleaning process. All cleaning steps are performed at this position. For cleaning, a (portal-like, U-shaped) portal traverse, hereinafter referred to as traverse 15 for short, is guided over the vehicle 30 in the longitudinal direction thereof. The traverse 15 comprises electronic and mechanical components. The signal or data connections are marked with a dotted line in the figures. In a car wash system, the vehicle 30 is moved through the car wash system to the individual cleaning stations, for example by a drag chain installed on one side. The car wash system 100 shown in FIG. 1 does not represent a restriction for functionality to the gantry car wash system or the car wash line. Rather, the functions described with FIG. 1 can be applied to both the gantry car wash system and the car wash line and result in the same advantages.

The motor vehicle should preferably be positioned in the washing system 100 in such a way that the longitudinal axis of the traverse 15 is arranged approximately transversely (approx. 90°) to the longitudinal direction of extension of the vehicle 30 and can be moved along the longitudinal direction of extension of the vehicle 30. The longitudinal extension direction of the vehicle 30 results from the direction of travel F (cf. FIG. 6). In addition to the lateral brushes, the washing unit 100 may comprise a roof cleaning brush and/or a roof drying unit (not shown in the figures).

The structural design of the washing system with the respective components and cleaning units is known per se and does not require a more detailed description. In particular, the washing system comprises at least two brushes rotatably mounted on the traverse 15 by means of a suspension A, the suspension A in turn being arranged on a carriage FS which is movable on the traverse 15. A cross member QT is provided for this purpose, which is designed to accommodate the two travel slides 18, 19. In the embodiment example shown in the figures, the cross-member QT extends over the entire width of the portal traverse 15; in alternative embodiments, two separate cross-members can also be formed to accommodate the two travel carriages, extending over a maximum range of movement of the travel carriages. For further details, reference is made, for example, to DE 10 2014 112 388 A1.

The washing system 100 further comprises at least a first cleaning brush 11 and a second cleaning brush 12. The first cleaning brush 11 and the second cleaning brush 12 are arranged laterally of the vehicle 30 and are moved against the vehicle 30 for the cleaning process until the brush hairs are in contact with the vehicle 30 or exert a pressure on the vehicle 30. The cleaning brushes 11, 12 are designed as rotating cleaning brushes. The cleaning brush 11 can be guided along the first outer surface 31 of the vehicle 30. The cleaning brush 12 can be guided along the second outer surface 32 of the vehicle 30. The cleaning brushes are guidable along the entire length of the vehicle 30, from the front to the rear of the vehicle 30. The present example of the washing system 100 is described with only two cleaning brushes 11, 12. However, the disclosure is not limited to this and can be implemented in any embodiment in an analogously modified manner, for example, also with further cleaning brushes.

The rotatable cleaning brushes 11, 12 are each pivotably mounted on a carriage 18, 19 on the traverse by means of the suspension A. The carriage 18, 19 can be moved along the longitudinal axis of the traverse 15. The carriages 18, 19 can be moved along the longitudinal axis of the traverse 15. The first carriage 18 and the second carriage 19 can be moved separately and independently of each other in the direction of extension of the traverse 15, in particular by means of a respective electric drive. In an advantageous manner, the first cleaning brush 11 and the second cleaning brush 12 can thus be moved in the direction of the vehicle sides 31, 32 of the vehicle 30. Thus, different sized vehicles 30 can be cleaned evenly or the cleaning of the vehicle 30 can be adapted according to the contour of the vehicle 30.

The travel carriages 18, 19 each have a measuring unit for detecting travel positions. A first measuring unit 13 for detecting a travel position of the first travel carriage 18 is arranged on the first travel carriage 18. A second measuring unit 14 for detecting a travel position of the second travel carriage 19 is arranged on the second travel carriage 19. The travel positions detected can be used, for example, to determine or provide the travelled distance of the travel carriages 18, 19. The width of the vehicle 30 can be determined via the travel distance resulting from a start position and a detected travel position of the travel carriages 18, 19. The center position of the vehicle 30 can be determined via the width of the traverse or via the travel range of the travel carriages, taking into account the width of the vehicle 30, and via the exact travel position of the travel carriages. The first measuring unit 13 and the second measuring unit 14 can be designed as a magnetic field sensor. This has the advantage that the position of the first travel carriage 18 and/or the second travel carriage 19 can be determined more precisely. In addition, a high resolution can be achieved by the magnetic field sensor, whereby an exact position of the first and second carriage 18, 19, for example in the millimeter range, can be provided.

The detection of the travel position of the first travel carriage 18 and the second travel carriage 19 can be triggered or initiated via a detection of a power consumption change of the brush rotation drive of the respective cleaning brush and/or via a detection of the angle change of the cleaning brushes.

Figure 2:
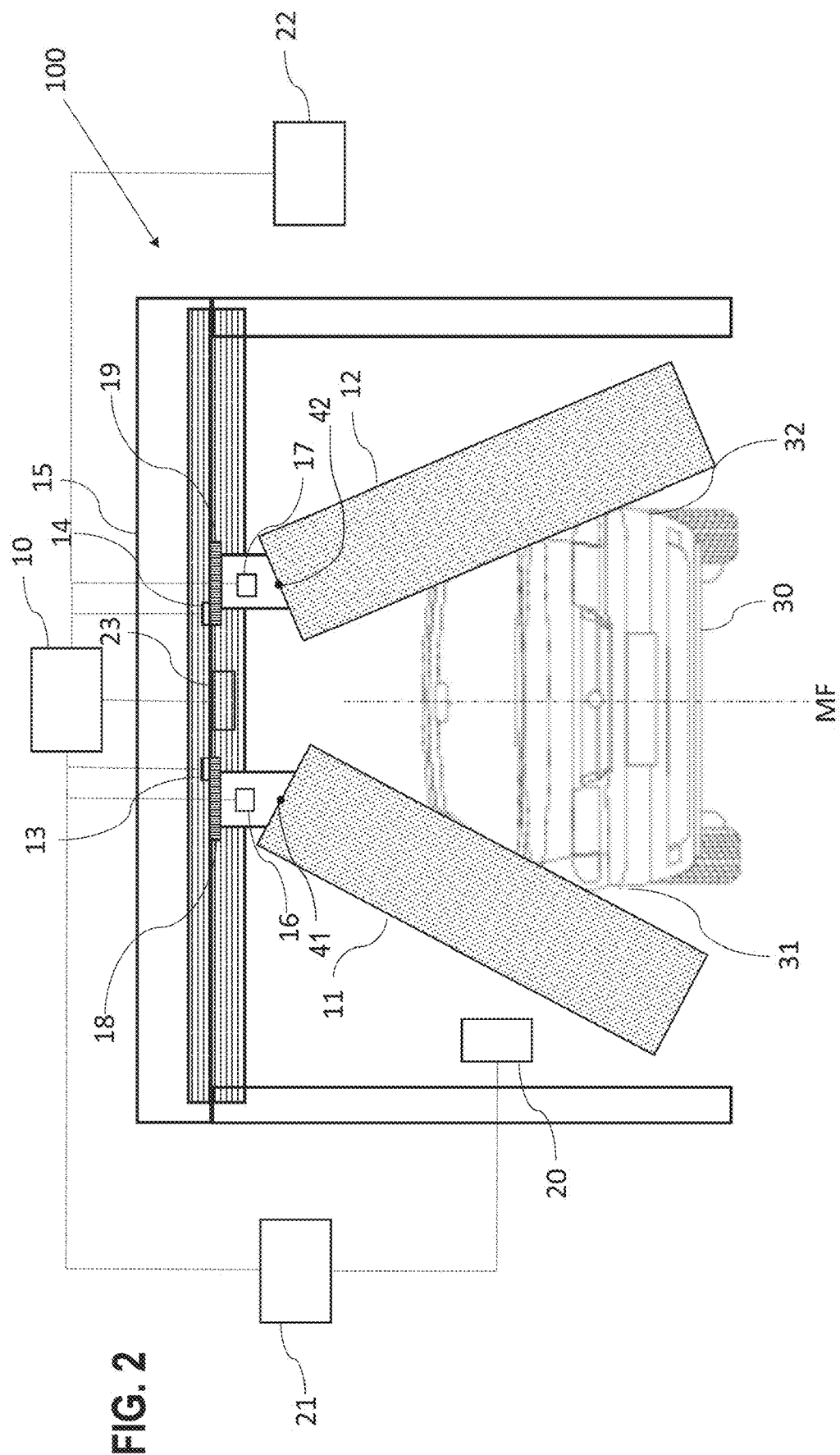
FIG. 2 is a schematic representation of a further exemplary embodiment of a washing system according to the disclosure.
Figure 3:
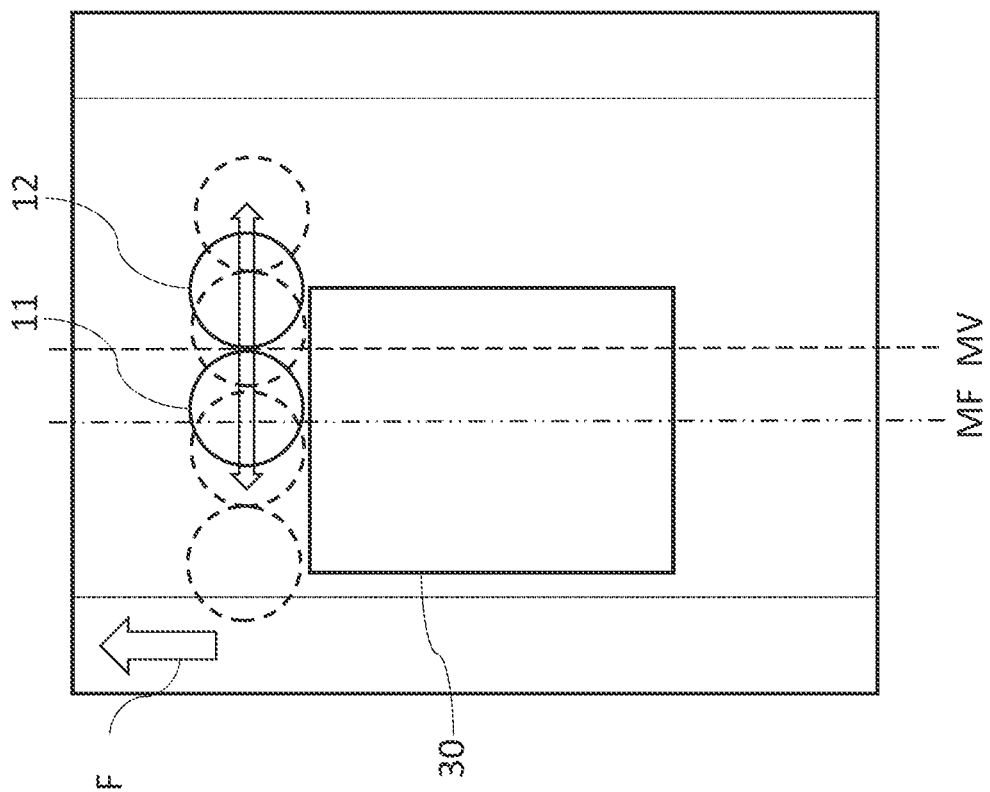
FIG. 3 is a schematic representation of an exemplary embodiment of a device known in the prior art.

FIG. 2 shows a schematic representation of a further embodiment of a washing system according to the disclosure.

The embodiment example shown in FIG. 2 comprises the elements of the embodiment example shown in FIG. 1 and is supplemented by further elements. In FIG. 2, reference signs 16, 17 denote the third measuring unit and the fourth measuring unit which include the first and second power sensors, respectively. The third measuring unit 16 is arranged on the first cleaning brush 11 and is further configured to detect an angle of inclination of the first cleaning brush 11. The fourth measuring unit 17 is arranged on the second cleaning brush 12 and is further configured to detect an angle of inclination of the second cleaning brush 12. An angle sensor may be used for the first measuring unit 16 and for the second measuring unit 17. The inclination angles of the first cleaning brush 11 and the second cleaning brush 12 may be detected during the cleaning operation of the vehicle sides 31, 32 of the vehicle 30. For example, the angles of inclination can be determined during a first cleaning operation in which the rotating cleaning brushes 11, 12 are guided along the vehicle side 31, 32 of the vehicle 30 with a low contact pressure or during a second cleaning operation in which the rotating cleaning brushes 11, 12 are guided along the vehicle side 31, 32 of the vehicle 30 with a stronger contact pressure. It should be noted that the sequence and the selected contact pressure can be varied as desired.

In one embodiment, the angle sensor may include a magnet and a magnetic field sensor. Because it is a magnetic angle sensor, interference to the angle sensor from vibration, temperature fluctuations, humidity, or from water pressure is minimized. To determine the angle of inclination of the cleaning brushes 11, 12, the change in orientation of the magnetic field is determined. In one embodiment, the magnet may be arranged remote from the magnetic field sensor on the pivot axis 41, 42 of the respective cleaning brush. In this case, the magnet is spaced apart from the magnetic field sensor on the pivot axis 41, 42 and the magnetic field sensor is provided on the suspension of the brush but not on the pivot axis. Thus, the angle of inclination of the respective cleaning brush can be monitored continuously and with particularly high accuracy by the angle sensor. In embodiments with several swivel axes per cleaning brush 11, 12, an angle sensor can be provided for each swivel axis of the respective cleaning brush 11, 12. It should be noted that all embodiments in which an angle sensor is provided enable special sensor and actuator technology, because the angle sensor is advantageously not a point sensor and also not an acceleration-based sensor.

In an advantageous manner, the center position MF of the vehicle 30 can be determined from the travel position of the first travel carriage 18 and the travel position of the second travel carriage 19 by the first measuring unit 13 and the second measuring unit 14 at the time when the cleaning brushes 11, 12 come into contact or engagement with the side surface of the vehicle 30.

The first cleaning brush 11 and the second cleaning brush 12 can be moved towards or away from the vehicle 30 along the direction of extension of the traverse 15 by means of their respective slides 18, 19 in such a way that the cleaning brushes 11, 12 can be moved along the vehicle 30 with constant pressure. The angle of inclination of the first and second cleaning brushes 11, 12 can be determined continuously.

The washing system 100 may further comprise a fifth measuring unit 23 formed, for example, on the traverse 15. The fifth measuring unit 23 may be configured to determine a start position and an end position of the vehicle 30 in the longitudinal extension direction and/or in the transverse extension direction of the vehicle 30. The fifth measuring unit 23 can be designed as a light barrier or scanner. By means of the fifth measuring unit, for example, the length and/or the width of the vehicle 30 can be determined.

The washing system 100 includes a device 10 configured to determine the geometric center position MF of the vehicle 30 positioned within the washing system 100 based on the detected travel positions of the first travel carriage and the second travel carriage. The device 10 may thus determine the position of the vehicle 30, a deviation from the center of the washing system 100, and/or a skewed position of the vehicle 30 within the washing system 100. The device 10 may be configured as a computing unit that is connected to the car wash system 100 and optionally to other electronic units (e.g., a central database for processing vehicle geometry data, etc.) via a communication link, such as an Ethernet connection or serial connection (RS232, RS485). This further comprises, even if not shown in FIG. 2, that the device 10 is not locally bound to the car washing system 100, but can also be operated separately at another location. In addition, the device 10 may be connected to other electronic and/or mechanical components 20 (memory, control base, controls for components of the washing system 100). In FIG. 2, only one component 20 is shown for illustrative purposes.

In addition, the device 10 has a connection to an output unit 22. Via the output unit 22, information about the cleaning process, as well as about the positioning of the vehicle 30 within the car washing system 100, can be provided to the operator of the car washing system 100 and/or to the user.

Figure 4:
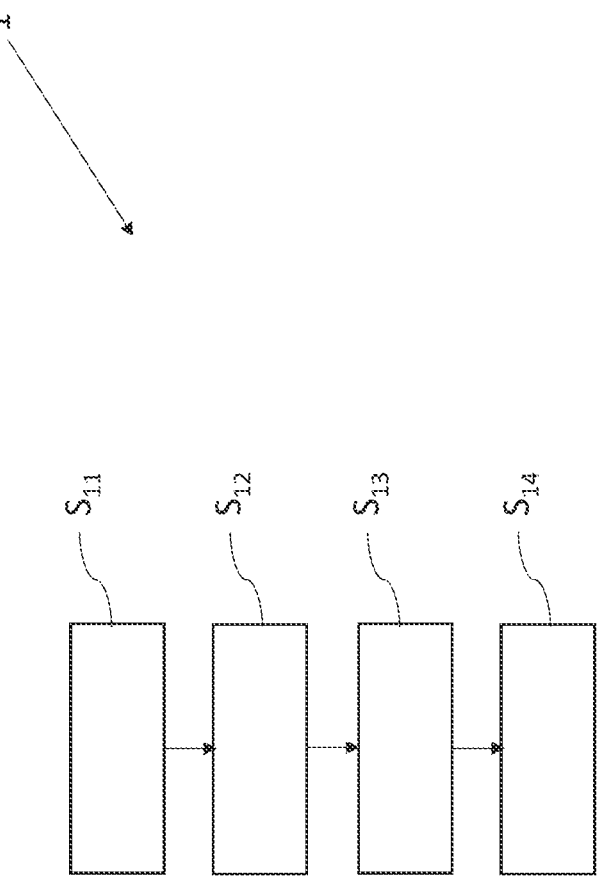
FIG. 4 is a flowchart illustrating an exemplary embodiment of a method according to the disclosure.

FIG. 4 shows a flow chart illustrating a possible embodiment of a process 1 according to the disclosure.

The method 1 for determining a geometric center position MF of a vehicle 30 positioned within a washing system 10 comprises several steps in the illustrated embodiment example. In a first step S11, control signals are provided for moving a traverse 15 along the longitudinal extension direction of the vehicle 30. At least one first cleaning brush 11 and at least one second cleaning brush 12 are arranged on the traverse 15, which can be guided along a first outer surface 31 and a second outer surface 32 of the vehicle 30. In a further step S12, control signals are provided for traversing the first and second travel carriages 18, 19 arranged on the traverse 15 along the longitudinal extension direction of the traverse 15. In a further step S13, travel positions of the first travel carriage 18 and the second travel carriage 19 are detected via a first measuring unit 13 on the first travel carriage 18 and via a second measuring unit 14 on the second travel carriage 19 as soon as the cleaning brush comes into contact with the vehicle 30. This is automatically detected via a corresponding sensor system (angle sensor and/or power sensor). In a step S14, the geometric center position MF of the vehicle 30 positioned within the washing system 100 is determined, based on the detected travel positions of the first travel carriage 18 and the second travel carriage 19.

In one embodiment, the detected travel position of the first travel carriage 18 and the second travel position of the second travel carriage 19 are detected at the moment when a power consumption change occurs due to the brush rotation drives of the cleaning brushes. The power consumption change may result from a contact of the cleaning brushes 11, 12 with one of the vehicle sides 31, 32 of the vehicle or from the loss of contact. The travel position of the first travel carriage 18 is determined via the first measuring unit 13 and the travel position of the second travel carriage 19 is determined via the second measuring unit 14.

Figure 5:
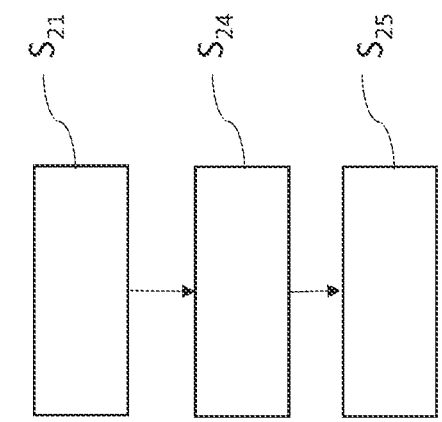
FIG. 5 is a flow chart illustrating a further exemplary embodiment of a method according to the disclosure.

FIG. 5 shows a flow chart illustrating a possible embodiment of a process 2 according to the disclosure.

The method 2 for cleaning a vehicle 30 positioned within a washing system 100 comprises several steps in the embodiment example shown. In a first step S21, the sensor data are acquired (travel positions of the carriages, possibly further data such as length/width of vehicle, etc.). In a further step S24, the center position of the vehicle 30 positioned within the washing system 100 is calculated—as described above—and in step S25, the vehicle 30 is cleaned based on the determined geometric center position MF of the vehicle 30.

In one embodiment, the detected travel position of the first travel carriage 18 and the second travel position of the second travel carriage 19 are detected at the moment when a power consumption change occurs due to the brush rotation drives of the cleaning brushes. The power consumption change may result from a contact of the cleaning brushes 11, 12 with one of the vehicle sides 31, 32 of the vehicle or from the loss of contact. The travel position of the first travel carriage 18 is determined via the first measuring unit 13 and the travel position of the second travel carriage 19 is determined via the second measuring unit 14.

The center position can be determined over the entire length of the vehicle 30 at a preconfigurable distance or at the front and rear of the vehicle or according to a time pattern. From the carriage positions determined for each area of the vehicle, the center position MF can be determined for the respective area of the vehicle 30. Using the repeatedly determined center position, further calculations can be carried out and, if necessary, cleaning components can be controlled in a modified manner. In addition, the user and/or the operator of the washing system can be provided with corresponding information about the status of the vehicle in the washing system and/or about the washing process.

Figure 6:
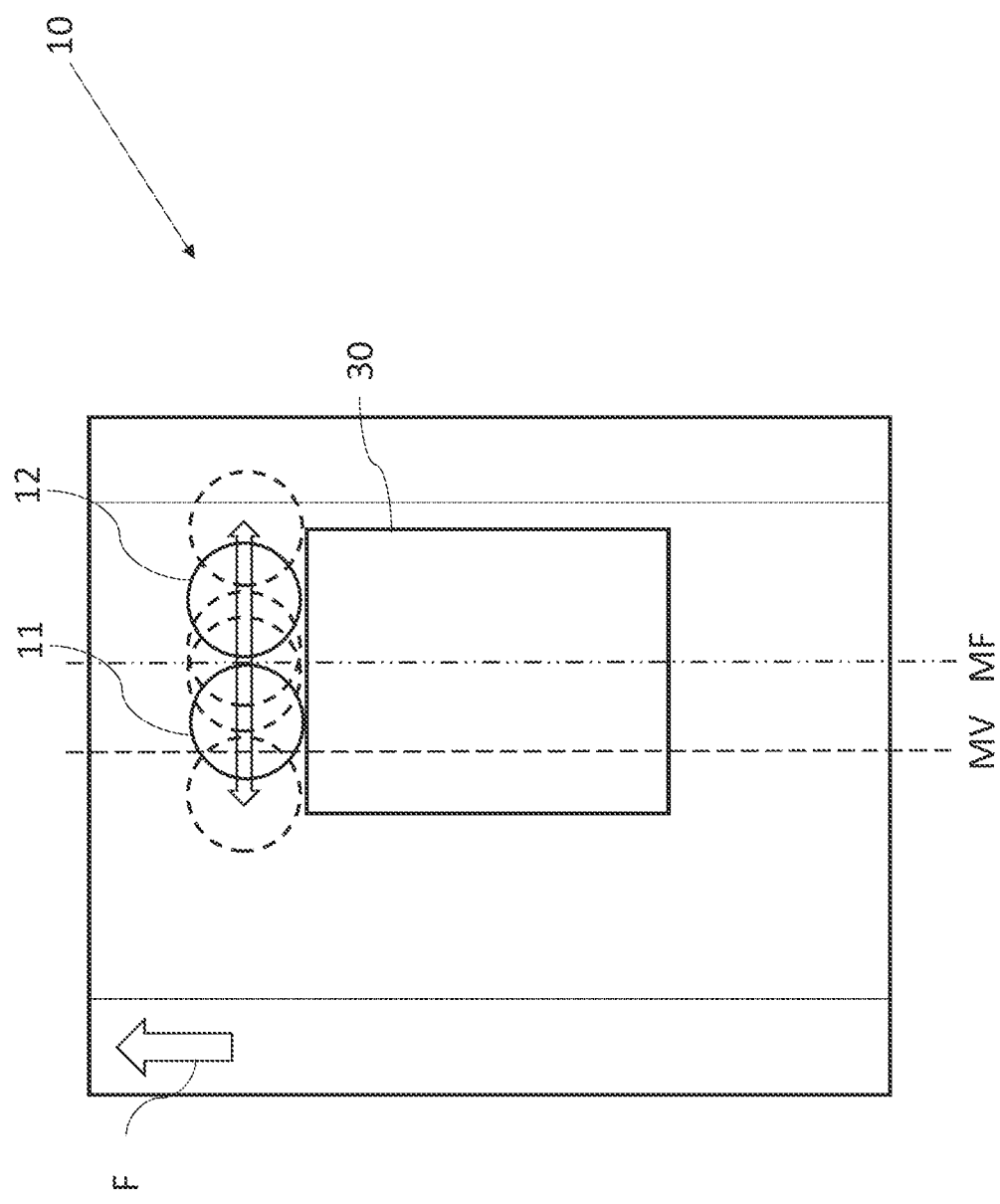
FIG. 6 is a schematic representation of a further exemplary embodiment of a washing system according to the disclosure.

FIG. 6 shows an illustration of a further embodiment of a washing system 100 according to the disclosure.

In FIG. 6, reference numeral 100 denotes the washing system according to the disclosure for determining a geometric center position MF of a vehicle 30 positioned within the washing system 100. The washing system 100 shown in FIG. 6 is not limited to a gantry washing system, but can be applied mutatis mutandis to a car wash line. In FIG. 6, the geometric center position MV of the washing system 100 is shown. In car wash systems 100 known in the prior art, the geometric center position MV of the car wash system 100 is used as a reference position for the procedure of a center overlap. Starting from the geometric center position MV of the washing system 100, the cleaning brushes 11, 12 move to the left and right, in particular to completely clean the rear of a vehicle 30. In FIG. 6, according to the present disclosure, the determined center position MF of the vehicle 30 is used as a reference position for a method of a center overlap. Starting from the geometric center position MF of the vehicle 30, the cleaning brushes 11, 12 move to the left and right, in particular to completely clean the rear of a vehicle 30. In FIG. 6, the vehicle 30 has a position strongly oriented to the right within the washing system 100. Advantageously, according to the disclosure, the center position MF of the vehicle 30 is used for the center overlap, whereby the cleaning brushes do not extend beyond the front or rear of the vehicle 30. The cleaning brushes 11, 12 shown dashed in FIG. 6 represent the positions during the center overlap. In this regard, the process time can be reduced and the cleaning result improved by optimizing the cleaning of the front and rear of the vehicle 30.

Figure 7:
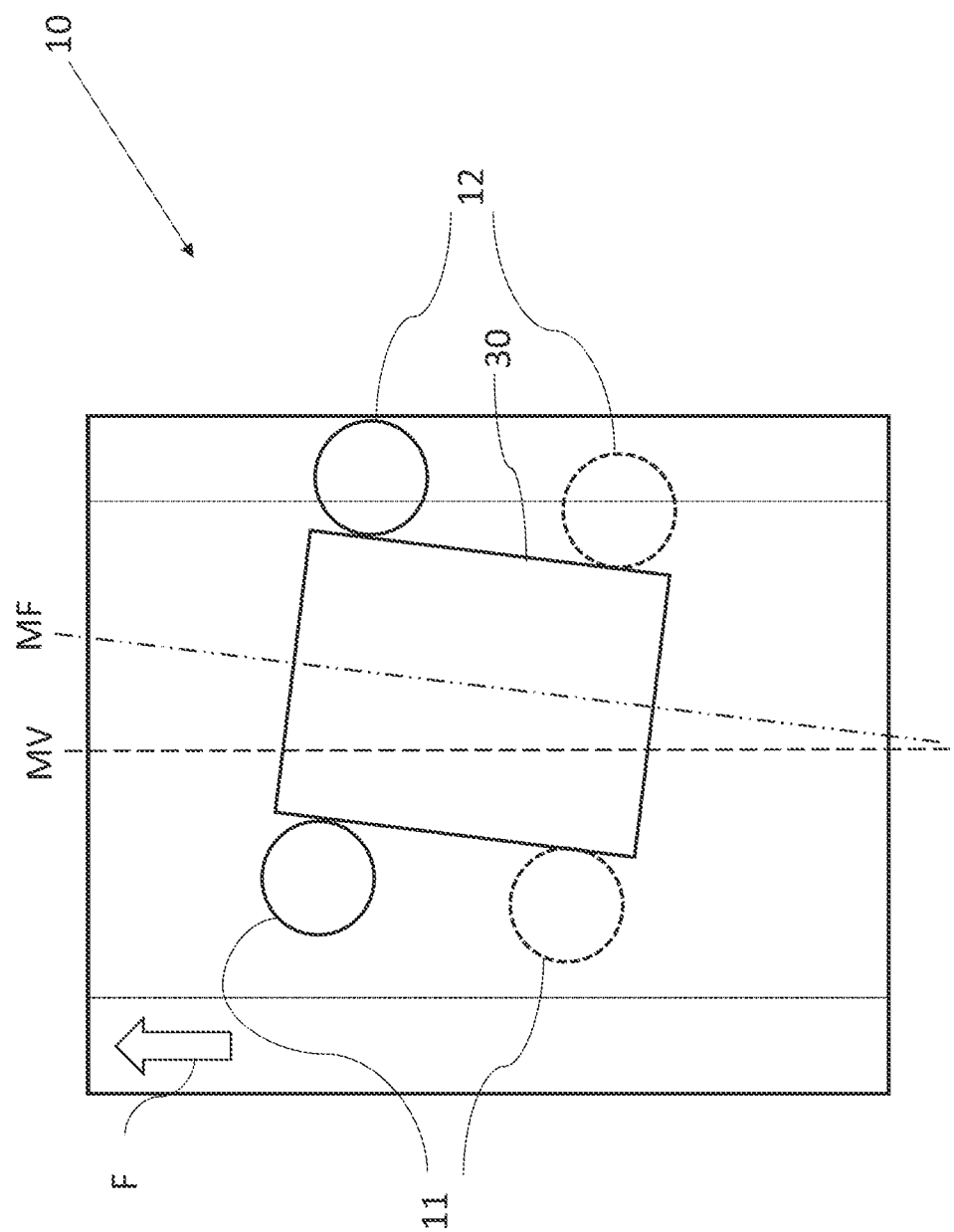
FIG. 7 is a schematic representation of a further exemplary embodiment of a washing system according to the disclosure.

FIG. 7 shows an illustration of a further embodiment of a washing system 100 according to the disclosure.

In FIG. 7, a vehicle 30 is positioned in a skewed position in the washing system 100. In particular, at the beginning of the cleaning process of the side surfaces of the vehicle 30, the cleaning brushes 11, 12 are fed onto the vehicle 30 according to the positioning (skewed position) of the vehicle 30. As described above, the determined carriage positions can be used to determine the center position MF of the vehicle 30 depending on the position of the motor vehicle in the washing system. Based on the determined center position MF, the infeed of the side brushes and/or the control (in particular the infeed) of further side cleaning units can be modified in a gantry car wash system, so that despite the inclined or skewed position of the vehicle, the process time is optimized and an appropriate cleaning result is achieved. In addition, corresponding cleaning units, for example a rim washer, can be deactivated if, for example, it can no longer reach the rim of the vehicle 30 (rear right) or the cleaning result does not meet the required standards. The deactivation of a rim washer can be signaled to the operator of the device 10 and/or of the vehicle 30 and/or displayed on an output unit.

In one embodiment, the washing system 100 may be designed as a washing line.

In summary, the present disclosure relates to a mechanism for a washing system for determining a geometric center position of a vehicle positioned within the washing system, based on the detected travel positions of the first travel carriage and the second travel carriage, wherein the travel positions are detected at a point in time when the side brush comes into contact with a side surface of the vehicle in each case. This can be carried out several times over the length of the vehicle, in particular in order to detect skewed positions of the vehicle and, based on this, to effect modified further control of the washing system with its units. The contact is detected in each case by a power sensor of the rotating side brush and/or by an angle sensor.

Finally, it should be noted that the description of the disclosure and the embodiments are in principle not to be understood restrictively with respect to any particular physical realization of the disclosure. All features explained and shown in connection with individual embodiments of the disclosure may be provided in different combinations in the subject matter according to the disclosure in order to simultaneously realize their advantageous effects.

The scope of protection of the present disclosure is given by the claims and is not limited by the features explained in the description or shown in the figures.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

1 Method for determining the center position
2 Cleaning procedure
10 Device
11 first cleaning brush
12 second cleaning brush
13 first measuring unit
14 second measuring unit
15 Traverse
16 third measuring unit, first power sensor
17 fourth measuring unit, second power sensor
18 first ride sled
19 second sled
20 Cleaning aggregates
21 Frequency inverter
22 Output unit
23 fifth measuring unit
30 Vehicle
31 first exterior
32 second outer surface
41 first pivot axis
42 second pivot axis
100 Car wash system
F Driving direction
MF Center position
MV Center axis of the car wash system
S11-S14 Procedure steps Procedure 1
S21-S24 Procedure steps Procedure 2

What is claimed is:

1. A car washing system for determining a geometric center position of a vehicle positioned within the car washing system, the car washing system comprising:
a traverse which extends transversely to the longitudinal axis of the vehicle and on which a first travel carriage and a second travel carriage are arranged, each of the first and second travel carriages being movable in a longitudinal direction of the traverse;
a first cleaning brush suspended from the first travel carriage;
a second cleaning brush suspended from the second travel carriage, wherein the first and second cleaning brushes are each driven via a brush rotation drive;
a first measuring unit arranged on the first carriage and configured to detect a first travel position of the first carriage;
a second measuring unit arranged on the second carriage configured to detect a second travel position of the second carriage;
a first power sensor configured to detect a first power consumption of the first cleaning brush;
a second power sensor configured to detect a second power consumption of the second cleaning brush; and
a controller configured to:

determine the geometric center position of the vehicle positioned within the car washing system based on the first travel position of the first travel carriage and the second travel position of the second travel carriage detected at a point in time at which each of the first power sensor and the second power sensor detects a changed measurement result.

2. The car washing system according to claim 1, wherein the first measuring unit is configured to determine the first travel position of the first travel carriage based on the first power consumption of the first cleaning brush, and
wherein the second measuring unit is configured to determine the second travel position of the second travel carriage based on the second power consumption of the second cleaning brush.

3. The car washing system according to claim 1, further comprising:
a third measuring unit configured to detect a first angle of inclination of the first cleaning brush about a first pivot axis extending transversely to the longitudinal direction of the traverse; and
a fourth measuring unit configured to detect a second angle of inclination of the second cleaning brush about a second pivot axis also extending transversely to the longitudinal direction of the traverse,
wherein the third measuring unit is configured to determine the first travel position of the first travel carriage based on the first angle of inclination of the first cleaning brush, and
wherein the fourth measuring unit is configured to determine the second travel position of the second travel carriage based on the second angle of inclination of the second cleaning brush.

4. The car washing system according to claim 3, wherein at least one of the third measuring unit and the fourth measuring unit includes an angle sensor.

5. The car washing system according to claim 3, wherein at least one of the first measuring unit, the second measuring unit, the third measuring unit, and the fourth measuring unit includes a magnetic field sensor.

6. The car washing system according to claim 1, wherein the controller is further configured to determine the geometric center position of the vehicle positioned within the car washing system based on the first travel position of the first travel carriage and the second travel position of the second travel carriage detected at a point in time at which a third measuring unit and a fourth measuring unit detects a further changed measurement result.

7. The car washing system according to claim 1, further comprising:
additional cleaning units,
wherein the controller is further configured to control, activate or deactivate the additional cleaning units in a dedicated manner based on the geometric center position of the vehicle positioned within the car washing system.

8. The car washing system according to claim 1, further comprising:
an output unit configured to output a warning signal based on the geometric center position of the vehicle positioned within the car washing system.

9. The car washing system according to claim 1, wherein at least one of the first measuring unit and the second measuring unit includes an incremental encoder or an absolute encoder.

* * * * *